(12) United States Patent
Fitzsimmons et al.

(10) Patent No.: US 11,844,488 B2
(45) Date of Patent: Dec. 19, 2023

(54) DUST COLLECTION SYSTEM BLAST GATE VALVE

(71) Applicant: Oneida Air Systems Inc., Syracuse, NY (US)

(72) Inventors: John J. Fitzsimmons, Syracuse, NY (US); Robert M. Witter, Englewood, FL (US); Jeffrey Hill, Cicero, NY (US); Joseph Baldwin, Syracuse, NY (US)

(73) Assignee: Oneida Air Systems, Inc., Syracuse, NY (US)

( * ) Notice: Subject to any disclaimer, the term of this patent is extended or adjusted under 35 U.S.C. 154(b) by 0 days.

(21) Appl. No.: 17/855,682

(22) Filed: Jun. 30, 2022

(65) Prior Publication Data
US 2023/0000298 A1    Jan. 5, 2023

Related U.S. Application Data

(60) Provisional application No. 63/216,617, filed on Jun. 30, 2021.

(51) Int. Cl.
| | |
|---|---|
| *F16K 3/02* | (2006.01) |
| *A47L 9/24* | (2006.01) |
| *A47L 7/00* | (2006.01) |
| *B08B 15/04* | (2006.01) |
| *F16K 31/08* | (2006.01) |
| *F16K 3/312* | (2006.01) |

(52) U.S. Cl.
CPC ............. *A47L 9/242* (2013.01); *A47L 7/0095* (2013.01); *A47L 9/248* (2013.01); *B08B 15/04* (2013.01); *F16K 3/0281* (2013.01); *F16K 3/312* (2013.01); *F16K 31/084* (2013.01)

(58) Field of Classification Search
CPC ........ A47L 9/242; A47L 7/0095; A47L 9/248; B08B 15/04; B08B 15/00; F16K 3/0281; F16K 3/312; F16K 3/32; F16K 11/22; F16K 31/084
USPC .......................................... 251/65, 326–329
See application file for complete search history.

(56) References Cited

U.S. PATENT DOCUMENTS

| | | | |
|---|---|---|---|
| 6,199,587 B1 * | 3/2001 | Shlomi | F16K 31/082 |
| | | | 137/625.5 |
| 9,599,246 B2 * | 3/2017 | Fletcher | F16K 31/048 |
| 9,666,349 B2 * | 5/2017 | Hampton | H01F 7/1646 |

* cited by examiner

*Primary Examiner* — John Bastianelli
(74) *Attorney, Agent, or Firm* — Bernhard P. Molldrem, Jr.

(57) ABSTRACT

The gate housing has a flow passage therethrough, the flow passage having an inlet and an outlet. The gate housing also includes a gate pocket configured to receive a blast gate and to allow the blast gate to slide therein between an open position and a closed position. The magnetic brake element is on the gate housing and includes a magnet mounted to the gate housing such that a magnetic force of the magnet extends into the gate pocket.

16 Claims, 14 Drawing Sheets

DUST COLLECTION SYSTEM BLAST GATE VALVE

REFERENCE TO RELATED APPLICATIONS

This application claims an invention disclosed in U.S. Provisional Application No. 63/216,617, filed Jun. 30, 2021, entitled "Tee Joint with Self-brake Blast Gate Valve". Benefit under 35 USC § 119(e) of the United States provisional application is claimed, and the aforementioned application is incorporated herein by reference.

BACKGROUND OF THE INVENTION

Field of the Invention

The invention pertains to the field of dust collection systems. More particularly, the invention pertains to a dust collection system joint fitting.

Description of Related Art

Wood working and similar activities that involve cutting, scraping, grinding, and/or polishing can produce large amounts of dust that may create health and safety issues. These problems can be avoided by using a dust collection system consisting of collection ducts and fittings, blowers, pre-separators, dust collection and filtration equipment. The typical woodshop uses a variety of saws, sanders, grinders, and other dust producing tools, and each of these is connected to a hose or conduit of a diameter appropriate to the tool and the amount of dust it creates. Circular saws, band saws, and routers may create a significant amount of dust and debris while scrapers produce a small amount and sanders may produce some intermediate amount. Because woodshop operations may involve using one or several tools at the same time, there has been an issue regarding how to connect all the tools to a single central dust collector in a way that does not impair dust separation for any of the tools. Dust is an environmental hazard in other industries as well, including grinding and polishing of stone or concrete.

Dust collection systems for wood dust and other types of dust, typically have a duct system that consists of a main trunk duct with one or more branch ducts that connect to the dust making machines or operations. There are a variety types of systems available for use by do-it-your-selfers [DIYs], commercial users, and industrial users. Sheet metal ducts are often used. Such systems typically consist of a snap lock or a spiral sheet metal pipe held together with sheet metal screws and duct tape. Another system called a quick-fit ("QF") system uses laser welded sheet metal pipe with rolled flanges formed on both ends. A band clamp with a "V" section profile clamps together opposing faces forming an airtight joint that is easy to assemble and disassemble. In addition, various types of vacuum or low-pressure hoses may be used as well as standard PVC pipe of the type often used in plumbing.

A suction and airflow volume mismatch can occur when tools are connected to and disconnected from the dust collection trunk. It is important to maintain an optimum combination of vacuum (or negative pressure) in the dust collection system and to maintain sufficient air flow to collect the dust from the various tools that may be connected at a given time.

Airflow can be closed in a branch duct with a gate that typically requires turning a set screw to bear down on the gate and lock the gate in place. Operators frequently forget to tighten the screw sufficiently, which allows the gate to slip and be sucked closed by the air flowing through the valve, thus causing undesired airflow and/or system malfunction.

SUMMARY OF THE INVENTION

A dust collection system blast gate valve is disclosed that provides a self-braking blast gate adjustable to control vacuum pressure and air flow.

In accordance with an embodiment, a blast gate valve for a dust collection system includes a gate housing, a blast gate, and a magnetic brake element. The gate housing has a flow passage therethrough, the flow passage having an inlet and an outlet. The blast gate is in the gate housing between the inlet and the outlet, and is configured to slide between an open position and a closed position. In the closed position, the blast gate obstructs more cross-sectional area of the flow passage than the blast gate obstructs in the open position. The magnetic brake element is on at least one from the group consisting of the gate housing and the blast gate. The magnetic brake element is configured to frictionally oppose sliding movement of the blast gate.

In accordance with another embodiment, a joint fitting for a dust collection system includes a gate housing, a blast gate, and a magnetic brake element. The gate housing has a flow passage therethrough, the flow passage having an inlet and an outlet. The blast gate is in the gate housing between the inlet and the outlet, and is configured to slide between an open position and a closed position. In the closed position the blast gate obstructs more cross-sectional area of the flow passage than the blast gate obstructs in the open position. A magnetic brake element is on at least one from the group consisting of the gate housing and the blast gate. The magnetic brake element is configured to frictionally oppose sliding movement of the blast gate.

In accordance with another embodiment, a joint fitting for a dust collection system includes a gate housing and a magnetic brake element. The gate housing has a flow passage therethrough, the flow passage having an inlet and an outlet. The gate housing also includes a gate pocket configured to receive a blast gate and allow the blast gate to slide therein between an open position and a closed position. The magnetic brake element is on the gate housing and includes a magnet mounted to the gate housing such that a magnetic force of the magnet extends into the gate pocket.

DETAILED DESCRIPTION OF THE INVENTION

Figure 1:
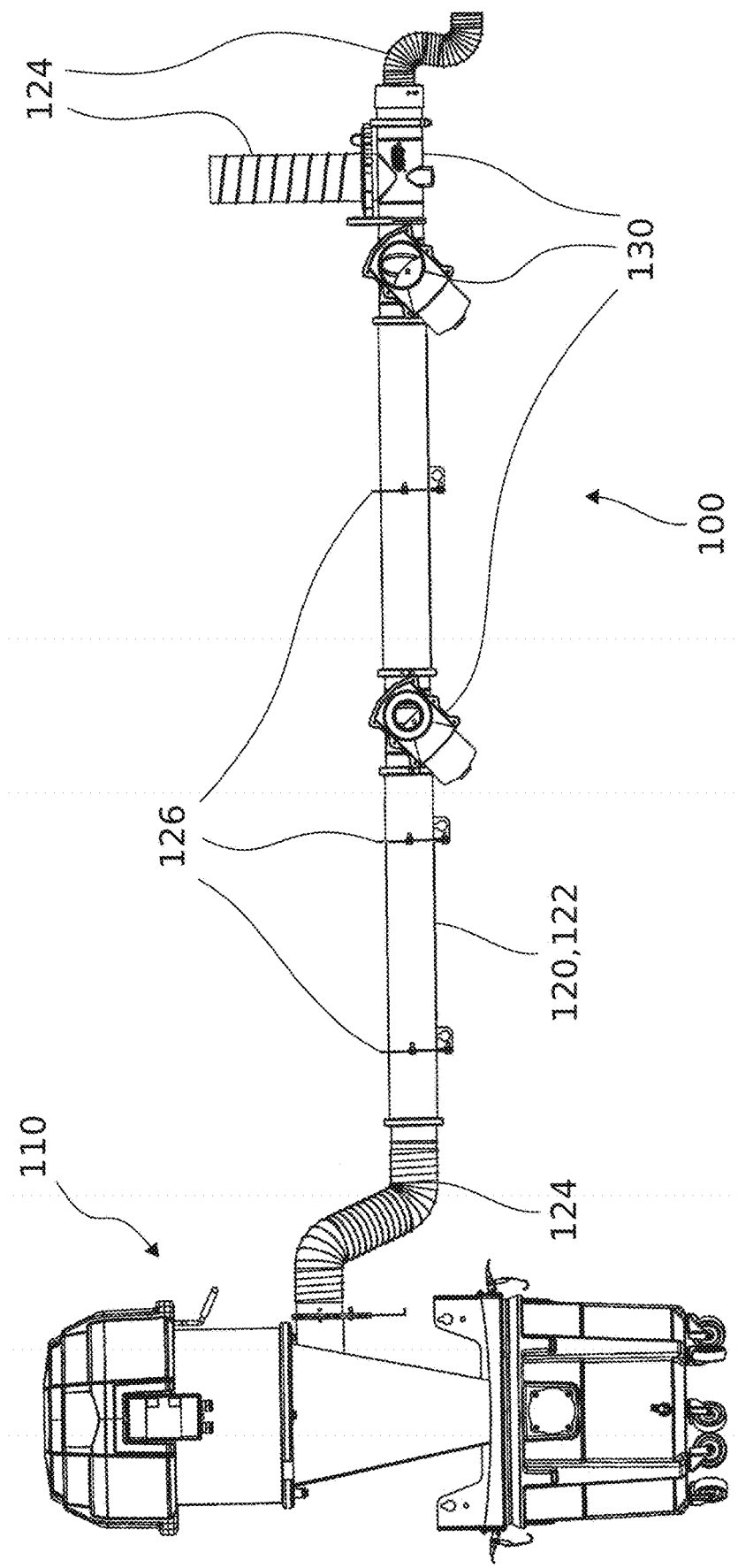
FIG. 1 shows a side view of a dust collection system with a dust collector and ducts, according to an embodiment.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "approximately" and "about", when qualifying a quantity, shall mean the quantity with a tolerance plus or minus 10 percent of the quantity, unless otherwise specified.

As discussed above, a blast gate valve for a dust collection system is disclosed that provides a self-braking blast gate adjustable to control vacuum pressure and air flow. The blast gate valve can be integrated or built into a duct or other conduit, or configured as a joint fitting to connect multiple ducts, conduits, or fittings. The joint fitting can be further configured to connect two, three, or more segments of duct or pipe. The joint fitting can, for example, be a tee joint or a wye joint, and can be compatible for connection and/or use with typical or conventional conduits, ducts, pipes, hoses, fittings, support brackets, and connector clamps used in wood shop dust collection systems or other industrial vacuum dust collection systems.

FIG. 1 shows a side view of a dust collection system 100 with a dust collector 110 and ducts 120. The ducts 120 can be connected to tools that generate dust, and the dust collector 110 can create a vacuum within the ducts 120 to draw air and dust from the tools. In the illustrated embodiment, the dust collector 110 is connected to wall-mounted ducts 122 by way of a flexible duct or hose 124. The wall-mounted ducts 122 are supported by wall brackets 126. One or more joint fittings 130, such as tee joints, wye joints, or other branch joints, can be included to connect the ducts 120.

Figure 2:
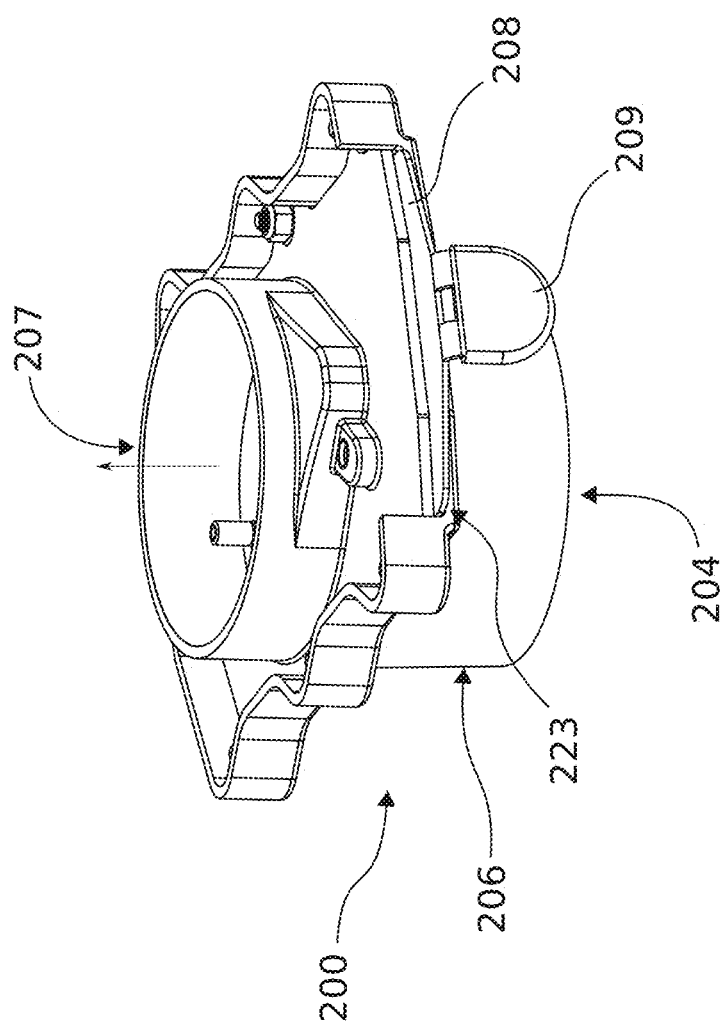
FIG. 2 shows a perspective view of a joint fitting for a dust collection system, according to an embodiment.

FIG. 2 shows a perspective view of a joint fitting 200 for a dust collection system such as dust collection system 100 illustrated in FIG. 1. The joint fitting 200 includes a gate housing 202 having a flow passage 204 therethrough. The gate housing 202 can be fabricated by conventional or future-developed methods. For example, the gate housing 202 can be rotationally molded static conductive high-density polyethylene, injection molded plastic, stamped metal, or cast metal. The flow passage 204 has an inlet 206 and an outlet 207. Air can flow through the gate housing 202 from the inlet 206 to the outlet 207, or alternatively from the outlet 207 to the inlet 206. In some embodiments, the gate housing 202 can taper to the inlet 206 and/or to the outlet 207 to allow connections to pipes, ducts, hoses, or fittings of various diameters.

A blast gate 208 can be slid between an open position and a closed position in the gate housing 202 between the inlet 206 and the outlet 207 to vary the amount of air able to flow between the inlet 206 and the outlet 207. The blast gate 208 can include a handle 209 to facilitate manual operation.

Figure 3:
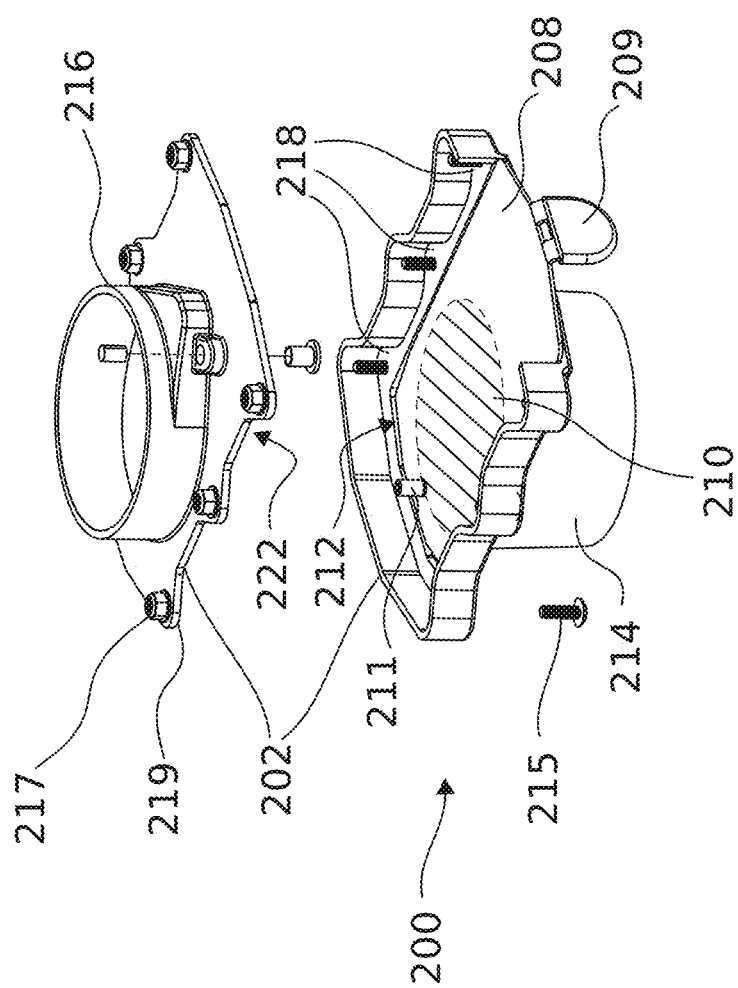
FIG. 3 shows the joint fitting of FIG. 2, including a blast gate in a closed position, according to an embodiment.

FIG. 3 shows the blast gate 208 in the closed position, entirely covering a cross-sectional area 210 of the flow passage 204 to block air flow through the flow passage 204. In some embodiments, the closed position can cover less than the entire cross-sectional area of the flow passage 204. In the closed position, the blast gate 208 obstructs more cross-sectional area of the flow passage 204 than the blast gate 208 in the open position.

Figure 4:
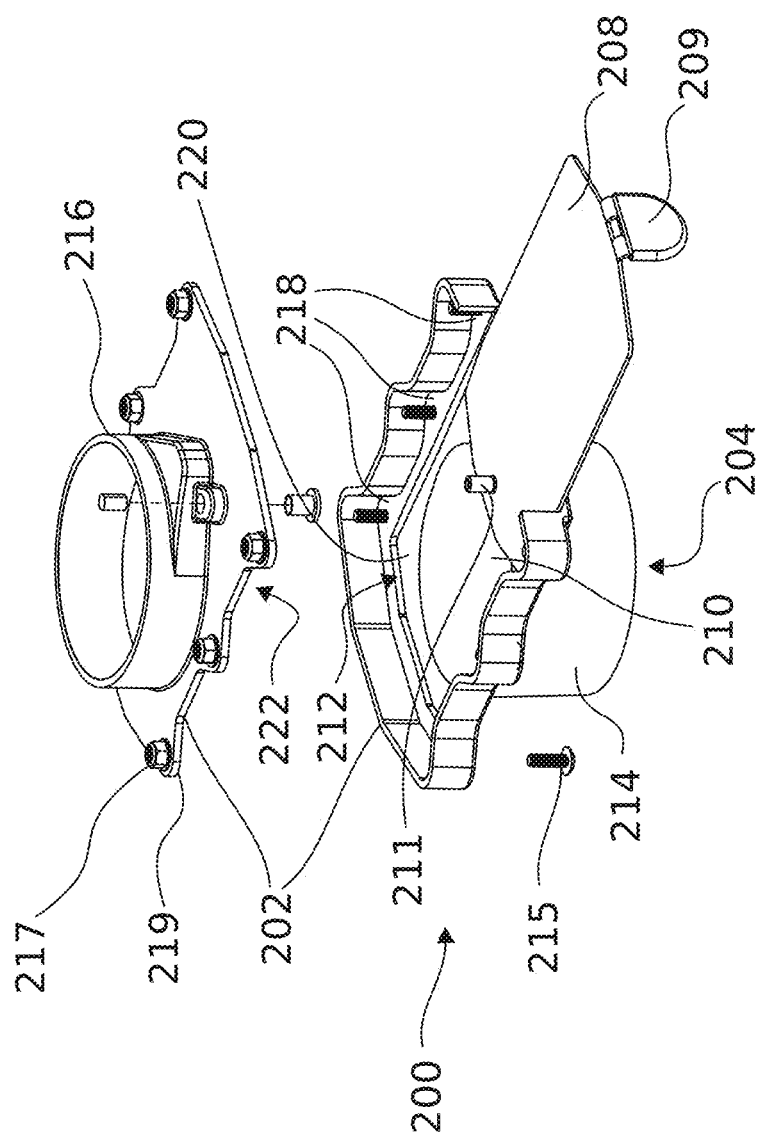
FIG. 4 shows the joint fitting of FIG. 2, including the blast gate of FIG. 3 in an open position, according to an embodiment.

FIG. 4 shows the blast gate 208 in the open position, allowing more air to flow through the flow passage 204 than when the blast gate 208 is in the closed position. In some embodiments, the open position can include the blast gate 208 obstructing other desired amounts of the flow passage 204. A stop element 211 can be attached to the blast gate 208 to limit the degree to which the blast gate 208 can open. The stop element can be or can include a pin, such as a PEM stud or a formed member. When traveling to the open position, the stop element 211 strikes the gate housing 202 to prevent further travel of the blast gate 208 in an opening direction.

As seen in FIG. 3 and FIG. 4, the blast gate 208 is positioned in a pocket 212. The pocket 212 can be formed as a cavity within a single piece constituting the gate housing 202, or the pocket 212 can be formed between a first housing portion 214 and a second housing portion 216, wherein the first housing portion 214 and the second housing portion 216 are fastened together. The first housing portion 214 and the second housing portion 216 can be fastened together by conventional means, such as by screws or bolts, which would allow the first housing portion 214 to be separated from and reattached to the second housing portion 216. In the illustrated embodiment, bolts 215 and nuts 217 are shown. In the illustrated embodiment, the first housing portion 214 has platforms 218 located around a periphery of the pocket 212 outside the pocket 212 where the blast gate 208 is positioned, such that bolts through the platforms do not interfere with the blast gate 208 or its movement between the closed position and the open position. The platforms 218 are raised above an interior pocket-defining surface 220 of the first housing portion 214, the interior pocket-defining surface 220 defining the pocket 212. The second housing portion 216 has flanges 219 that can mate with the platforms 218. One of the bolts 215 can be inserted through each pair of platforms 218 and flanges 219 and fastened with one of the nuts 217.

Figure 5:
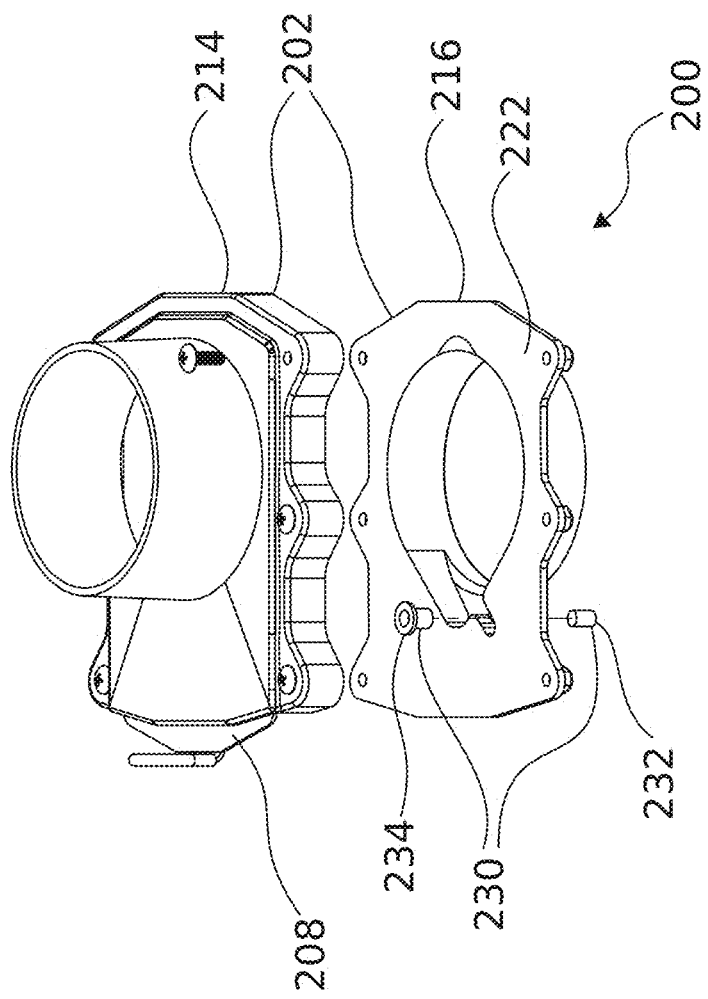
FIG. 5 shows a perspective view of the joint fitting of FIG. 2 with a first housing portion separated from a second housing portion.

An interior pocket-defining surface 222 of the second housing portion 216 extends continuously between and across the platforms, such that the height of the screw platforms 218 above the interior pocket-defining surface 220 of the first housing portion 214 is also the height of the pocket 212. FIG. 5, which shows a perspective view of the joint fitting 200 with the first housing portion 214 separated from the second housing portion 216 but in an orientation rotated 180 degrees relative to FIG. 3 and FIG. 4, shows the interior surface 222 of the second housing portion 216. Referring to FIGS. 3-5, the height of the pocket 212 can be sufficient to allow sliding movement of the blast gate 208 within the pocket 212 without pressure from both the interior pocket-defining surface 220 of the first housing portion 214 and the interior pocket-defining surface 222 of the second housing portion 216. In such embodiments, there can be a clearance fit of the blast gate 208 within the pocket 212. The pocket 212 includes a slot opening 223 sufficiently wide and tall to allow the blast gate 208 to be moved between the open position and the closed position (see FIG. 2). Alternatively, the height of the pocket 212 can be configured such that when the blast gate 208 slides between the open position and the closed position, the blast gate 208 simultaneously slides against the interior pocket-defining surface 220 of the first housing portion 214 and the interior pocket-defining surface 222 of the second housing portion 216. In such embodiments, the level of frictional force facilitates retention of the blast gate 208 in any position between the open position and the closed position, but the level is low enough to allow easy manual movement of the blast gate 208.

To facilitate retention of the blast gate 208 in any desired position after manual adjustment, the joint fitting 200 includes a magnetic brake element 230 to oppose sliding movement of the blast gate 208. FIG. 5 shows the magnetic brake element 230 on the gate housing 202. In particular, in this illustrated embodiment, the magnetic brake element 230 is attached or connected to the second housing portion 216, though the magnetic brake element 230 can be connected instead to the first housing portion 214. The magnetic brake element 230 includes a magnet 232 and can also include a sleeve 234 or other structural member to connect to the gate housing 202 and hold the magnet 232. The blast gate 208 can be made of magnetic material such that a magnetic force of the magnet 232 draws the blast gate 208 toward and against the magnet 232 and/or the sleeve 234. Friction between the blast gate 208 and the magnet 232 and/or the sleeve 234 opposes sliding movement of the blast gate 208 in the pocket 212.

Figure 6:
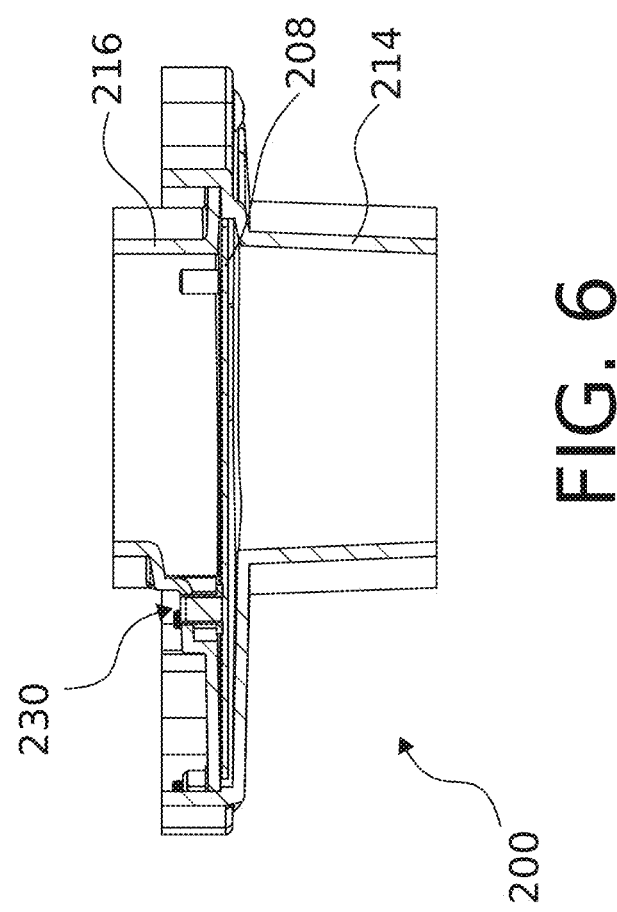
FIG. 6 shows a side view of the joint fitting of FIG. 2 cross-sectioned through a magnetic brake element.
Figure 7:
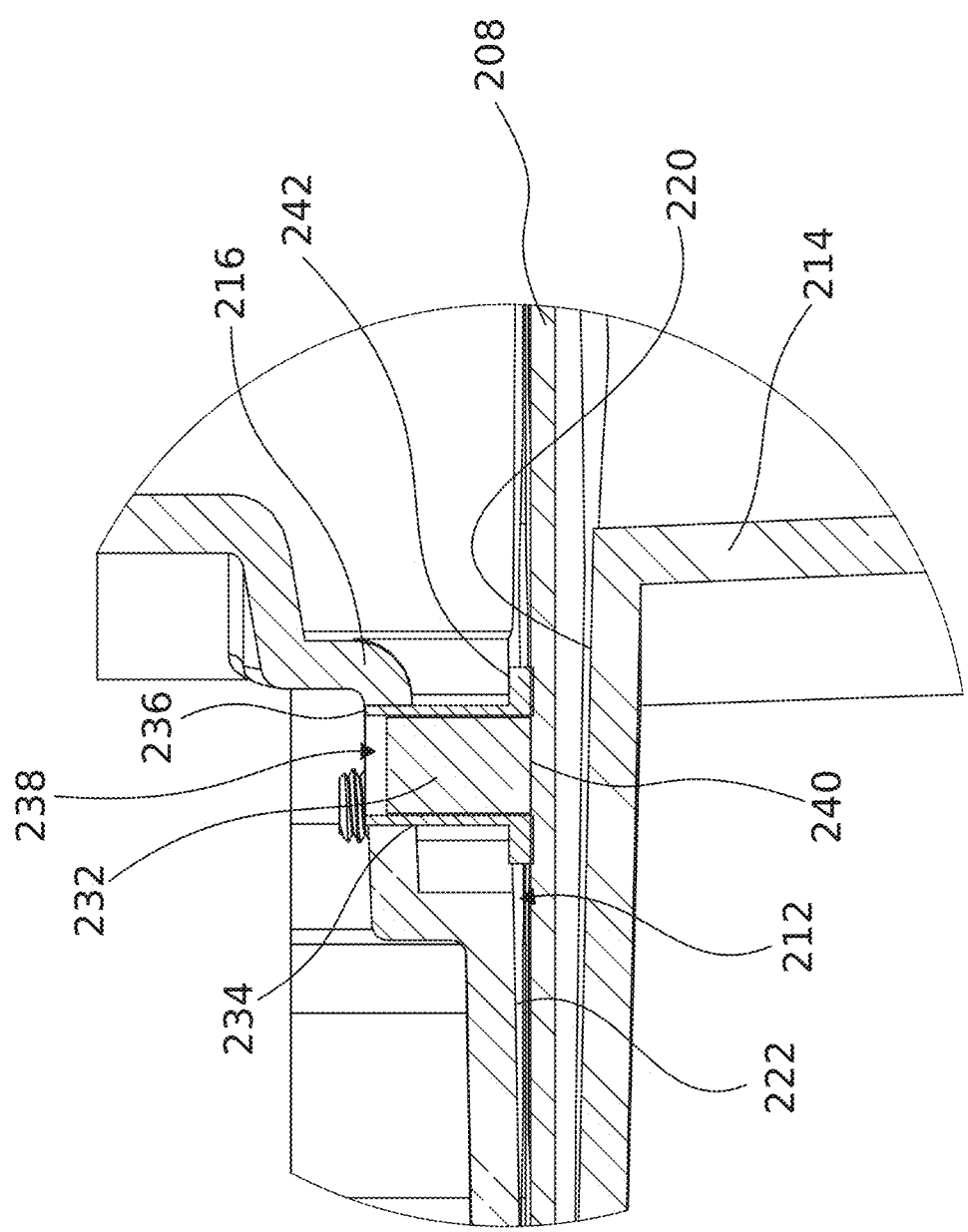
FIG. 7 shows a detailed view of the magnetic brake element of FIG. 6.
Figure 8:
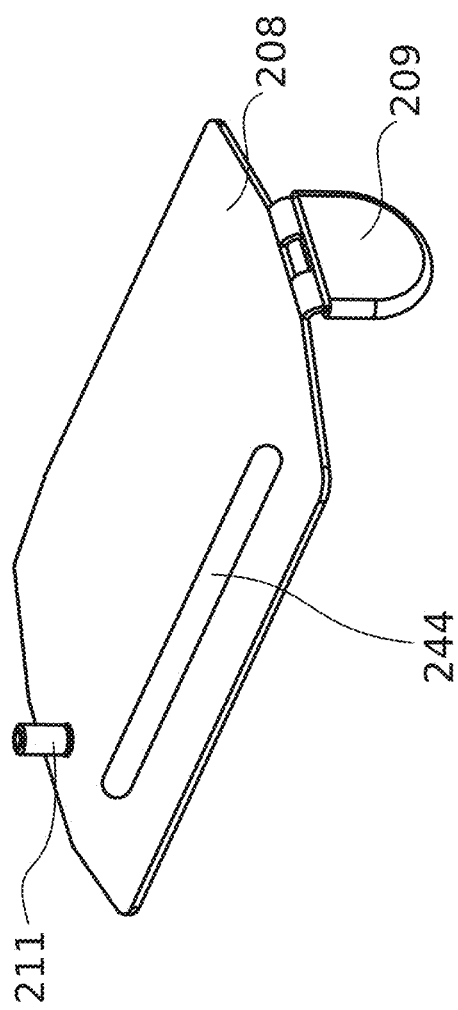
FIG. 8 shows a blast gate, according to an embodiment.

FIG. 6 shows a side view of the joint fitting 200 cross-sectioned through the magnetic brake element 230, and FIG. 7 shows a detailed view of the magnetic brake element 230. FIG. 6 and FIG. 7 provide an example of how the magnetic brake element 230 can be configured to oppose movement of the blast gate 208. Referring to FIG. 6 and FIG. 7, a base 236 of the sleeve 234 is fastened within a hole 238 in the second housing portion 216, by press-fit or other conventional means. The sleeve 234 extends from the base 236 toward the first housing portion 214 and the blast gate 208. The magnet 232 is held within the sleeve, again by press-fit or other conventional means. In some embodiments, the magnet can be rigidly or semi-rigidly attached to the housing 202 without the sleeve 234, such as with a fastener through a center of the magnet 232, by adhesive bonding to the housing 202, or by pressing directly into the hole 238 without the sleeve 234.

An end 240 of the magnet 232 is within the pocket 212 near or adjacent the blast gate 208 or approximately aligned with the interior surface 222 of the second housing portion 216. In some embodiments, the magnet 232 extends beyond the interior surface of the second housing portion 216. In some embodiments, the end 240 is within 10 mm of alignment with the interior pocket-defining surface 222. In some embodiments, the end 240 is within 5 mm of alignment with the interior pocket-defining surface 222. In some embodiments, the end 240 of the magnet 232 is flush with the interior pocket-defining surface 222 of the second housing portion 216.

The magnetic force of the magnet 232 and the corresponding frictional force against the blast gate 208 can be strong enough to hold the blast gate 208 in place during normal operation of the dust collection system 100, but weak enough to be overcome by manual force to adjust the position of the blast gate 208 toward the open position or the closed position. The sleeve can have an end flange 242 with a broader surface area or greater diameter than those of the magnet 232 to help guide the blast gate 208 past the magnet 232 during manually forced movement of the blast gate 208 and/or to provide a better surface for facilitating sliding friction against the blast gate 208. The end flange 242 can be closer to the blast gate 208 than the magnet 232, or in other words, can extend beyond the end 240 of the magnet 232 toward the first housing portion 214.

The joint fitting 200 is well suited for use with high pressure systems like the Oneida Air Systems® (Reg. No. 4034420) Supercell® (Reg. No. 5986393) Dust Collector. At high static pressure of such systems, leaks become a great concern. The strength of the magnetic brake element 230 is sufficiently strong, and the fit of the blast gate 208 with the housing 202 is improved over conventional art to reduce or minimize leaks.

The magnetic brake element 230 enables infinite adjustment between zero and full air flow and maintains the desired blast gate position without additional operator effort. A manually actuated clamp is unnecessary to hold the valve plate in position. In this system, an operator can simply move the blast gate 208 into a desired position for optimum air flow from the dust producing tool and for maintaining optimum system vacuum, and then continue working while the blast gate 208 stays in position.

Some conventional joint fittings with blast gates can be reconfigured with a magnetic brake element 230, at least in part, by modifying a screw boss for a locking screw to hold the magnet 232 and/or the sleeve 234.

Operation of the blast gate 208 can also be automatically or electronically controlled with the addition of an electric motor, solenoid, or fluid actuator connected to a suitable motor controller, with flow and pressure sensors providing feedback to the motor controller. In these embodiments, the magnetic brake element 230 keeps the blast gate 230 in position when the motor is not providing any force to slide the blast gate 208.

In some embodiments, the blast gate 208 can be made of nonmagnetic material (e.g., aluminum or plastic). In these embodiments, the magnetic brake element 230 includes a magnetic element 244 attached to, connected to, or embedded in the blast gate 230. The magnetic element 244 can be or can include a magnetic material or a magnet. The magnetic element 244 can be elongated in a direction parallel to a direction the blast gate 208 slides between the open position and the closed position. The magnetic element 244 can also extend a majority or all of a length equal to a distance between the closed position and the open position, such that the magnetic element 244 is adjacent the magnet 232 during a majority of or the entire span of movement of the blast gate 208 between the open position and the closed position.

In some embodiments in which the blast gate 208 is made of nonmagnetic material, the magnetic brake element 230 includes the magnet 232 attached to at least one of the first housing portion 214 and the second housing portion 216, and additionally includes a magnetic element 246 attached to the other of the first housing portion 214 and the second housing portion 216. The magnetic element 246 can be or can include a magnet or a magnetic material. The magnet 232 and the magnetic element 246 can be positioned in opposing pockets 212 with the magnet 232 and the magnetic element 246 aligned and oriented to attract each other. One or both the magnet 232 and the magnetic element 246 can be retained such that one or both the magnet 232 and the magnetic element 246 can move into contact or into position distanced less than a thickness of the blast gate 208. The magnet 232 and the magnetic element 246 clamp together onto the blast gate 208 to provide a sufficient level of friction to oppose undesired, nonmanual sliding movement of the blast gate 208.

Figure 9:
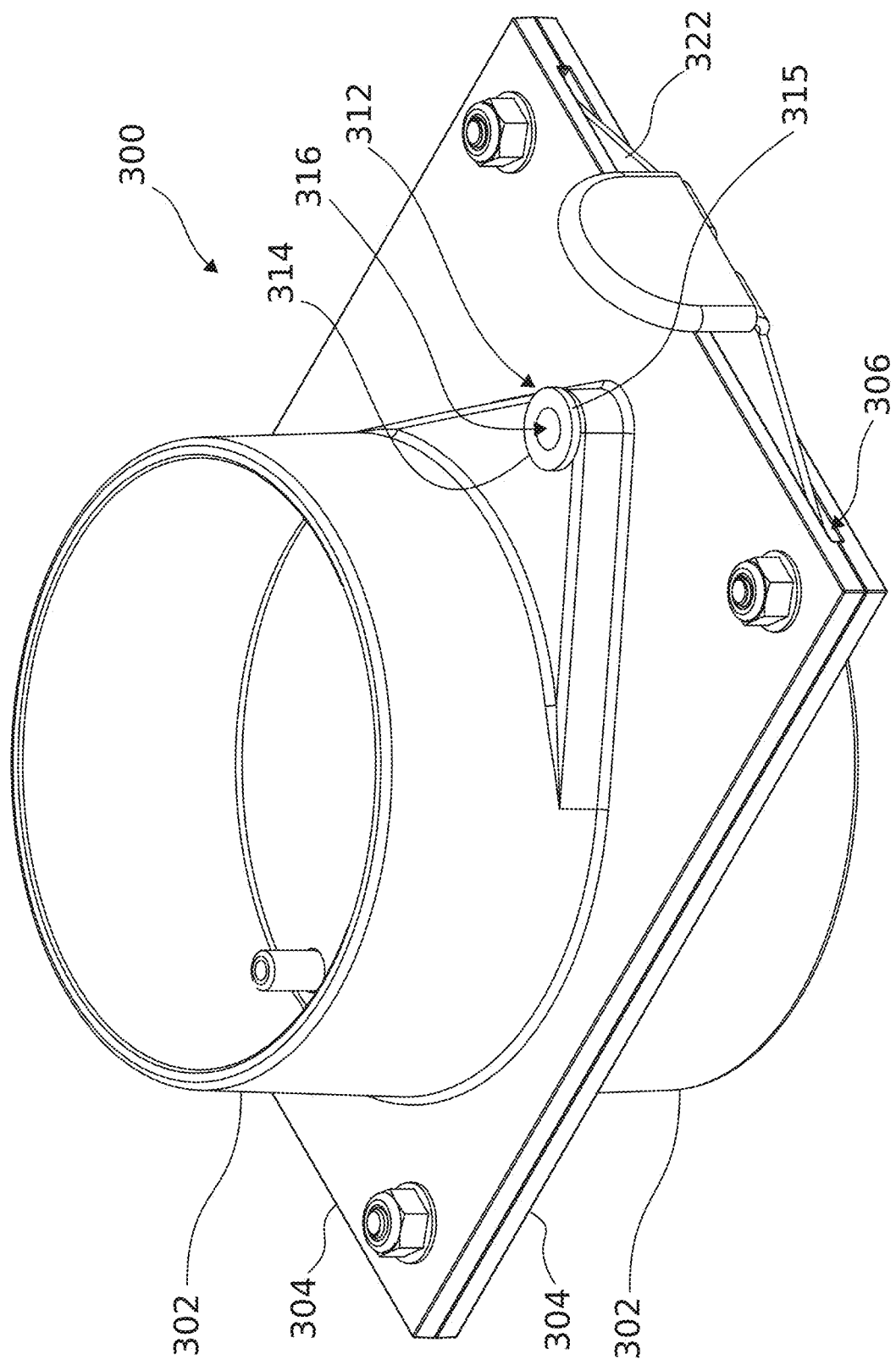
FIG. 9 shows a perspective view of a blast gate valve, according to an embodiment.
Figure 10:
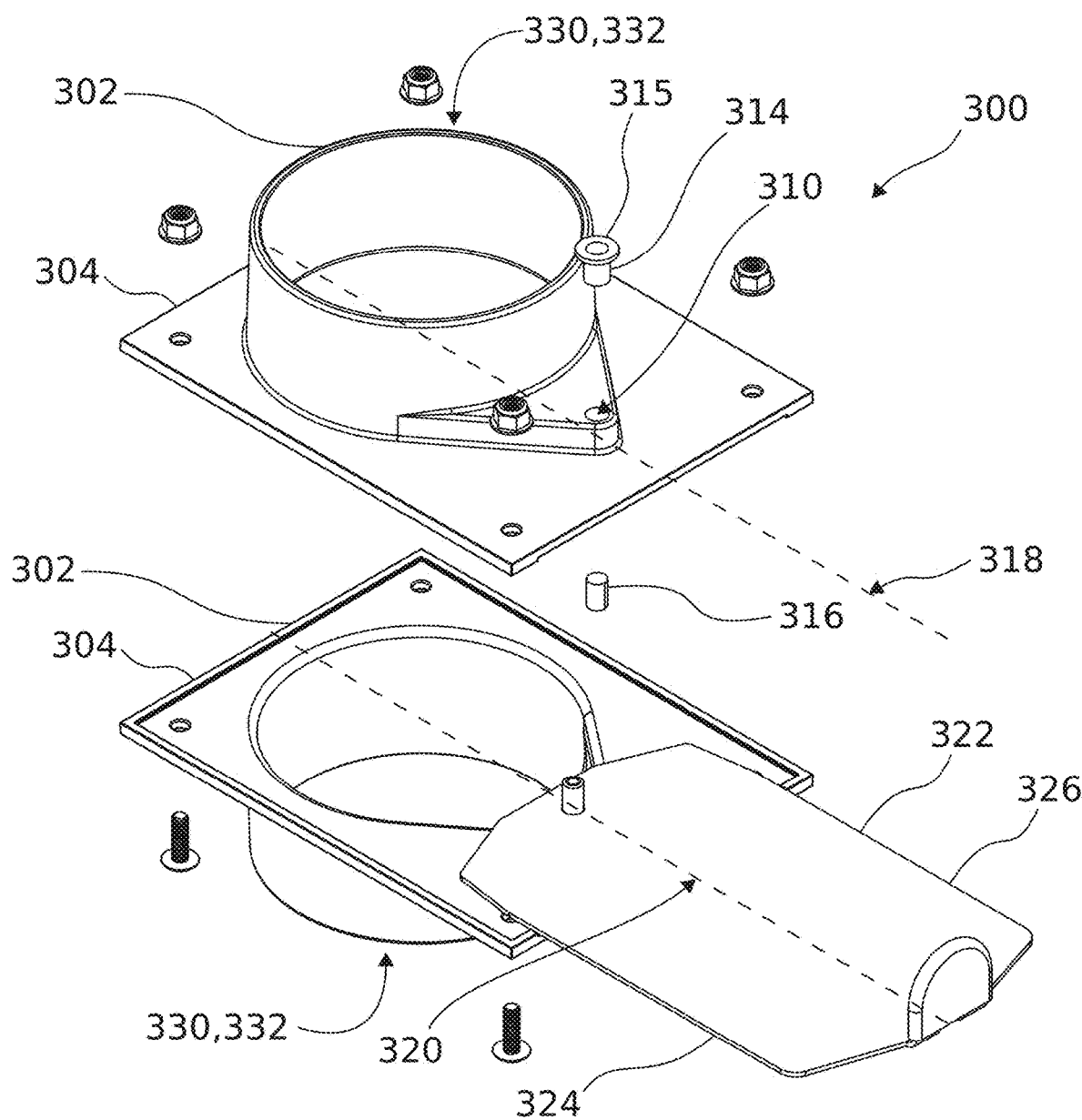
FIG. 10 shows an exploded perspective view of the blast gate valve of FIG. 9.
Figure 11:
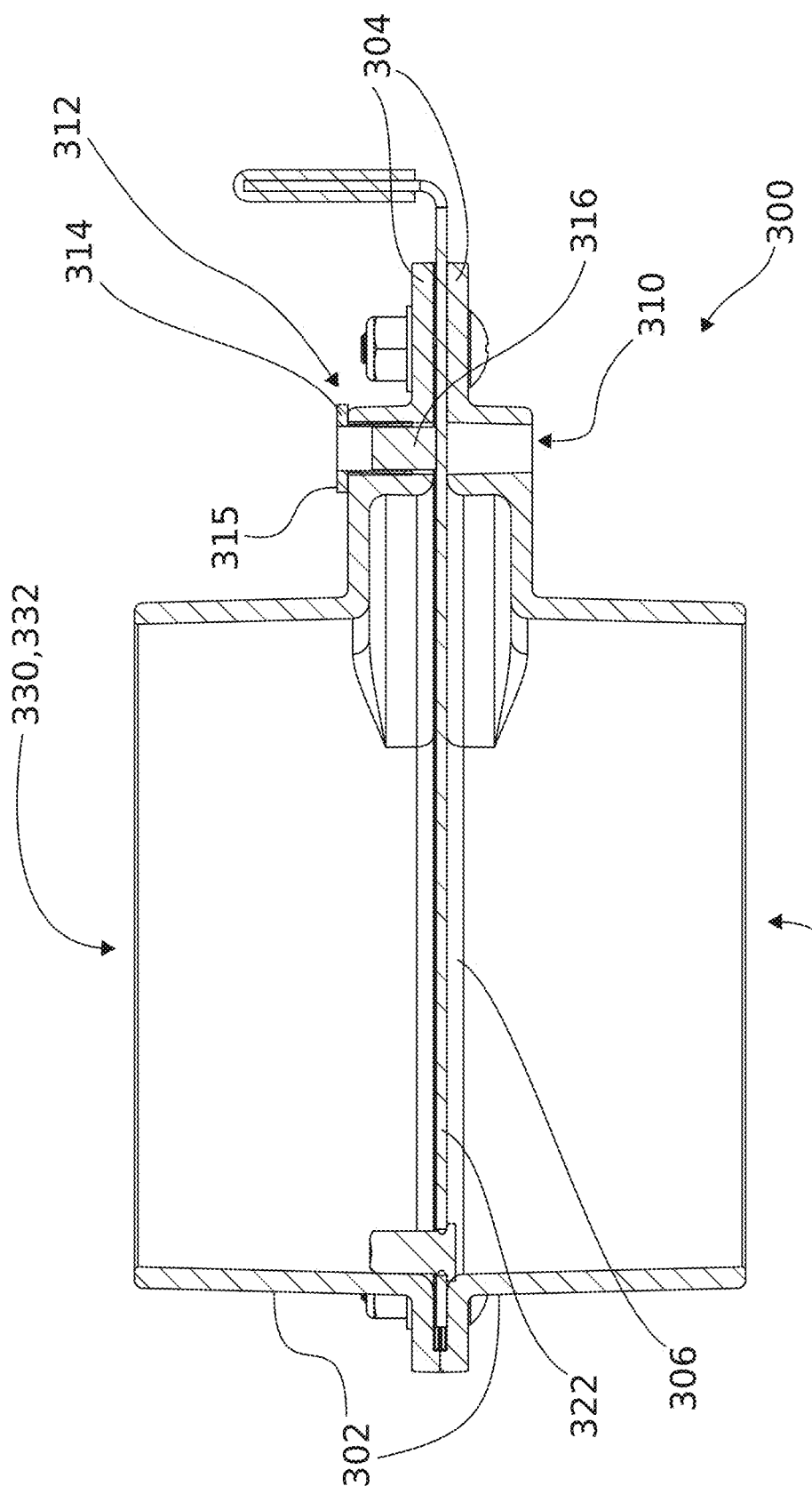
FIG. 11 shows a side view of the blast gate valve of FIG. 9, cross-sectioned along an axis of symmetry through a magnetic brake element.

FIGS. 9-11 illustrate an embodiment of a gate valve 300 with two symmetrical housing portions 302, which are identical. FIG. 9 shows a perspective view, FIG. 10 shows an exploded perspective view, and FIG. 11 shows a cross-sectional side view. Each symmetrical housing portion 302 includes a platform 304 around a periphery of a gate pocket 306 that is formed by symmetrically mating the platforms 304 of the two symmetrical housing portions 302. Each symmetrical housing portion 302 includes at least a mounting element, such as a hole 310 to facilitate mounting of a magnetic brake element 312. The hole 310 is configured to receive and hold a sleeve 314 and a magnet 316 of the magnetic brake element 312, such that the magnet 316 and/or the sleeve 314 protrude into the gate pocket 306 as discussed above with respect to FIGS. 5-7. The sleeve 314 can have an exterior flange 315 to facilitate insertion and removal of the sleeve 314 from the hole 310, and/or to facilitate location of the sleeve 314 and the magnet 316 to a desired depth toward or into the gate pocket 306. The magnet 316, the sleeve 314, the platform 304, and/or other parts of the symmetrical housing portion 302 can act as a friction surface against which a blast gate 322 is drawn under the attractive force of the magnet 316. The hole 310 can be located on an axis of symmetry 318 of each symmetrical housing portion 302, which is also an axis of symmetry 320 of a blast gate 322 in the gate pocket 306. This position of the hole 310 provides balanced braking of the blast gate 322 between peripheral sides 324, 326 as the blast gate 322 is slid into or out of the gate pocket 306 or between an open and a closed position. Utilizing two symmetrical housing portions 302 simplifies manufacturing complexity and expense. Further beneficially, an inlet 330 and an outlet 332 can each act interchangeably as an inlet or an outlet to connect to ducts, hoses, fittings, or other dust collection system components, such as but not limited to tees and wyes.

Figure 12:
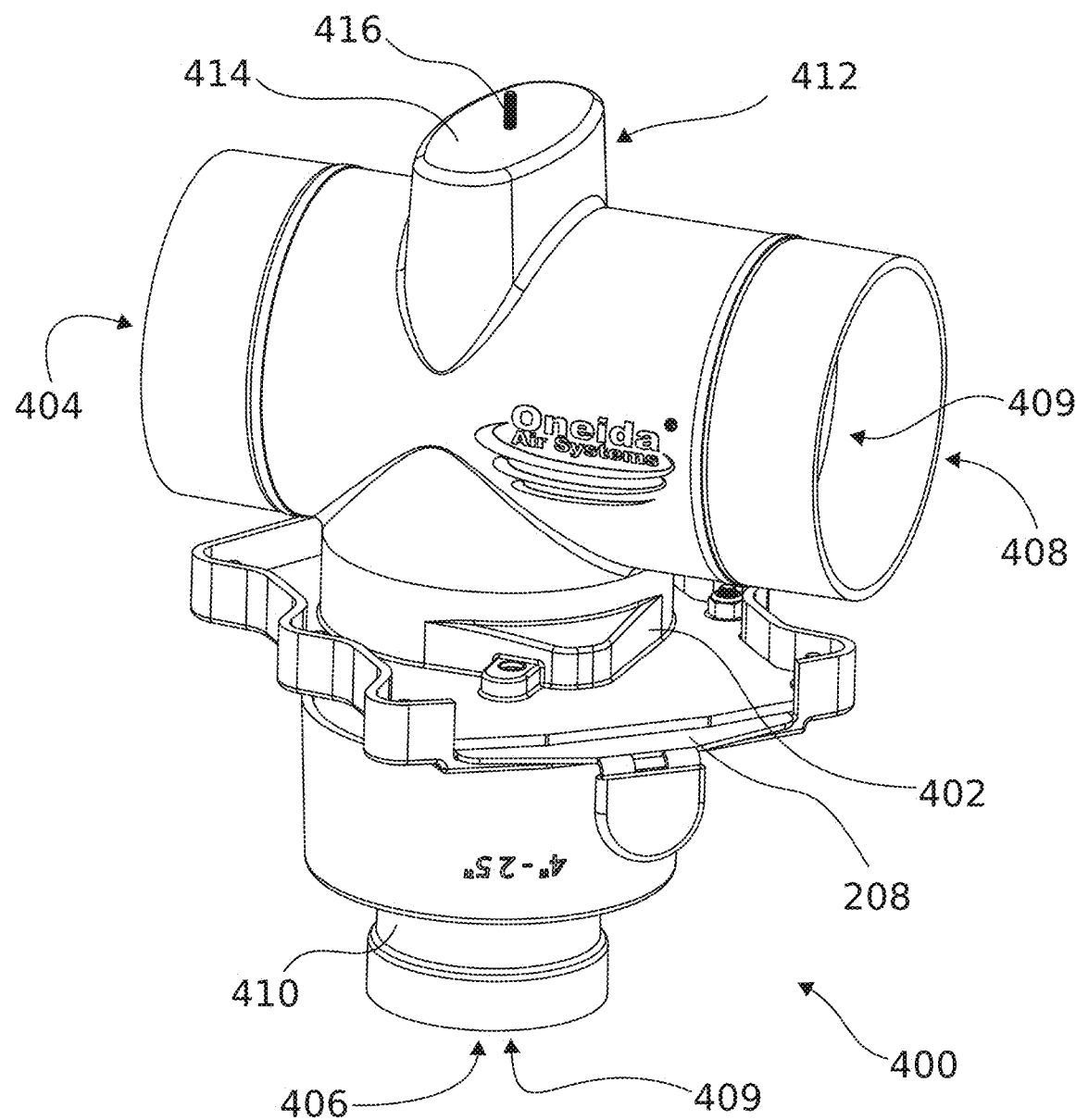
FIG. 12 shows a perspective view of a tee joint, according to an embodiment.
Figure 13:
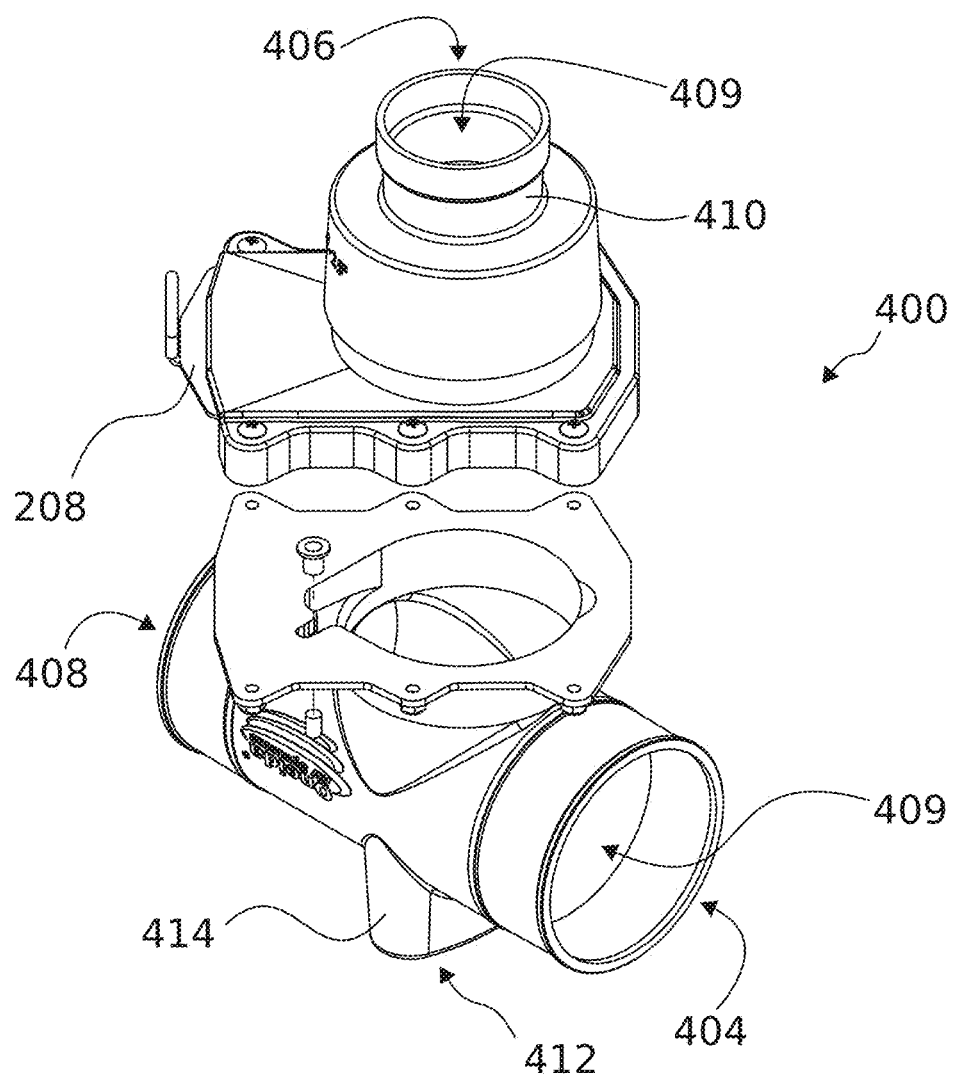
FIG. 13 shows an exploded view of the tee joint of FIG. 12.

In some embodiments, a branch fitting can be provided. FIG. 12, for example, shows a perspective view of a tee joint 400, and FIG. 13 shows an exploded view of the tee joint 400. A gate housing 402 has a first inlet 404 and a second inlet 406 instead of a single inlet. The first inlet 404 and the second inlet 406 face in directions about 90 degrees apart. The first inlet faces in a direction opposite outlet 408 and approximately 90 degrees from the second inlet 406. A flow passage 409 extends through the tee joint 400 to the first inlet 404, the second inlet 406, and the outlet 408. The first inlet 404 and the outlet 408 can be integrally formed with the gate housing 402, formed separately and non-removably integrated, or formed separately and removably connected. "Non-removable" means that the pieces cannot be separated by operating a fastener, and/or without damaging one of the pieces. A reducer 410 is also shown connected to the second inlet 406. The tee joint 400 can have a mounting element 412 including a protrusion 414 that can abut and be fastened to a wall using a fastener such as the screw 416 illustrated, a bolt, or another conventional or future-developed fastener. The protrusion 414 extends opposite the blast gate 208 and serves as a mounting base. The mounting element 412 can reduce or eliminate the need for additional mounting brackets.

Figure 14:
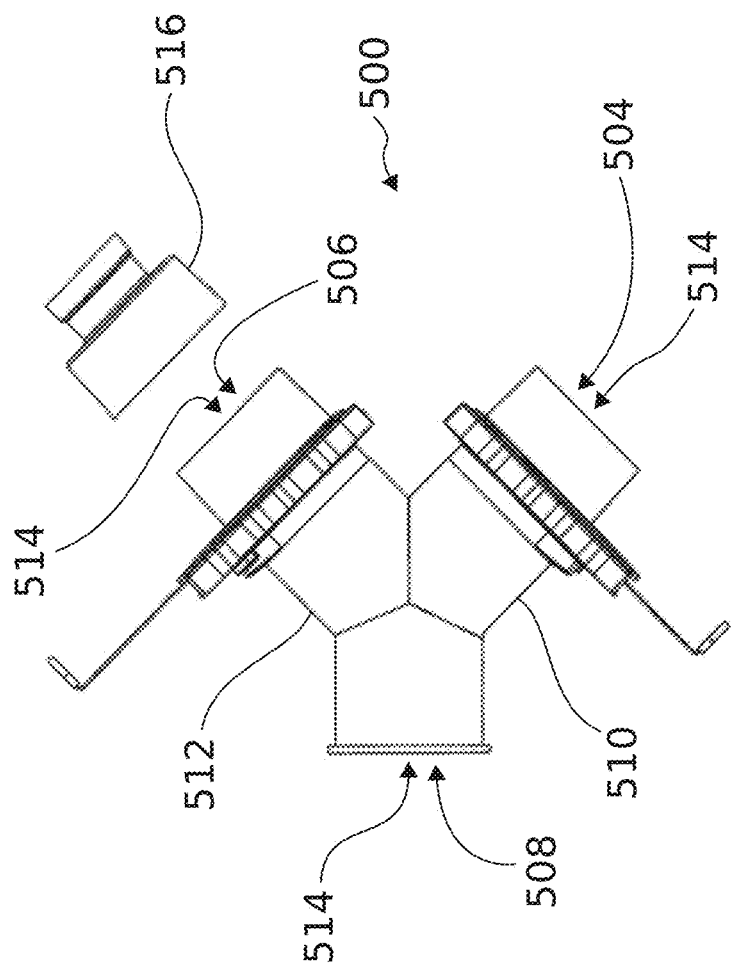
FIG. 14 shows a top view of a wye joint, according to an embodiment.

FIG. 14 shows a top view of a wye joint 500. A gate housing 502 has a first inlet 504 and a second inlet 506 instead of a single inlet. The first inlet 504 and the second inlet 506 face in directions angled about 90 degrees from each perpendicular, and about 135 degrees from the direction outlet 508 faces. A branch 510 leading to the first inlet 504 and a branch 512 leading to the second inlet 506 each include a gate as discussed with respect to FIGS. 2-7. A flow passage 514 extends through the wye joint 500 to the first inlet 504, the second inlet 506, and the outlet 508. A reducer 516 is also shown connected to the second inlet 506.

The inlets and outlets of the joint fitting 200, the gate valve 300, the tee joint 400, and the wye joint 500 can be configured to connect to any now known or future developed duct, hose, pipe, or fitting that can be used for dust collection systems. For example, the ductwork and fittings can be assembled with concentric collars or male and female connections held in place permanently with screws and or adhesives. Some embodiments have flanges formed on the ends of the tee or wye joint, and can be assembled to the main dust duct with band clamps that consist of a roughly V-shaped section formed into a nearly complete circle with a bolted or a toggle latch to provide clamping force. This connection configuration is commonly called a quick fit ("QF") fitting or a Nordfab® (Reg. No. 5348277) connection. The main trunk portion of the Tee or Wye fitting can thus match the ducting conduit of the same given diameter, allowing as many branches as are needed.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A joint fitting for a dust collection system, the joint fitting comprising:
   a gate housing having a flow passage therethrough, the flow passage having an inlet and an outlet;
   a blast gate in the gate housing between the inlet and the outlet, the blast gate configured to slide between an open position and a closed position, the blast gate in the closed position obstructing more cross-sectional area of the flow passage than the blast gate in the open position; and
   a magnetic brake element on at least one from the group consisting of the gate housing and the blast gate, the magnetic brake element configured to frictionally oppose sliding movement of the blast gate, and to provide magnetic force to the blast gate.

2. The joint fitting of claim 1, wherein the gate housing includes a first housing portion and a second housing portion, the first housing portion configured to mate with the second housing portion to form a gate pocket, the blast gate being slidably in the gate pocket.

3. The joint fitting of claim 2, wherein the gate pocket and the blast gate are sized and shaped such that when the blast gate slides between the open position and the closed position, the blast gate simultaneously slides against an interior surface of the first housing portion and the second housing portion.

4. The joint fitting of claim 1, wherein the gate housing includes a gate pocket, the blast gate being slidably in the gate pocket.

5. The joint fitting of claim 4, wherein the gate pocket includes a slot opening to allow the blast gate to be moved between the open position and the closed position.

6. The joint fitting of claim 4, wherein the magnetic brake element includes a magnet mounted to the gate housing adjacent an interior surface of the gate pocket such that a magnetic force of the magnet extends into the gate pocket.

7. The joint fitting of claim 6, wherein the magnet is flush with the interior surface of the gate pocket.

8. The joint fitting of claim 6, wherein the magnetic brake element further includes a sleeve attached to the gate housing, the magnet being held in the sleeve.

9. The joint fitting of claim 4, wherein the gate pocket and the blast gate are sized and shaped such that when the blast gate slides between the open position and the closed position, the blast gate slides against an interior surface of the gate pocket.

10. The joint fitting of claim 1, wherein the magnetic brake element includes a magnet attached to the blast gate.

11. The joint fitting of claim 10, wherein the magnet attached to the blast gate is elongated in a direction parallel to a direction the blast gate slides between the open position and the closed position.

12. The joint fitting of claim 10, wherein the magnet attached to the blast gate extends a majority of a distance between a fully closed position and a fully open position.

13. The joint fitting of claim 1, further comprising a stop element connected to the blast gate and extending in the gate pocket to limit movement of the blast gate toward the open position.

14. The joint fitting of claim 1, further comprising a tee joint with a first opening, a second opening, and a third opening, the gate housing being connected to one of the group consisting of the first opening, the second opening, and the third opening, the flow passage extending through the tee joint to the first opening, the second opening, and the third opening.

15. The joint fitting of claim 1, further comprising a wye joint with a first opening, a second opening, and a third opening, the gate housing being connected to one of the group consisting of the first opening, the second opening, and the third opening, the flow passage extending through the wye joint to the first opening, the second opening, and the third opening.

16. A blast gate valve for a dust collection system, the blast gate valve comprising:
   a gate housing having a flow passage therethrough, the flow passage having an inlet and an outlet;
   a blast gate in the gate housing between the inlet and the outlet, the blast gate configured to slide between an open position and a closed position, the blast gate in the closed position obstructing more cross-sectional area of the flow passage than the blast gate in the open position; and
   a magnetic brake element on at least one from the group consisting of the gate housing and the blast gate, the magnetic brake element configured to frictionally oppose sliding movement of the blast gate, and to provide magnetic force to the blast gate.

* * * * *